United States Patent
Park

(10) Patent No.: US 8,052,520 B2
(45) Date of Patent: Nov. 8, 2011

(54) REGISTRATION SYSTEM FOR GAME ITEM SALE AND A METHOD THEREOF

(75) Inventor: Ji Hyun Park, Seoul (KR)

(73) Assignee: NHN Corporation, Seongnam-si (KR)

( * ) Notice: Subject to any disclaimer, the term of this patent is extended or adjusted under 35 U.S.C. 154(b) by 743 days.

(21) Appl. No.: 11/522,880

(22) Filed: Sep. 15, 2006

(65) Prior Publication Data
US 2007/0060315 A1    Mar. 15, 2007

Related U.S. Application Data

(63) Continuation of application No. PCT/KR2005/000767, filed on Mar. 17, 2005.

(30) Foreign Application Priority Data

Mar. 18, 2004 (KR) .................. 10-2004-0018230

(51) Int. Cl.
*A63F 9/24* (2006.01)
*A63F 13/00* (2006.01)
(52) U.S. Cl. .................... 463/25; 463/8; 463/9
(58) Field of Classification Search .......... 463/8, 9, 463/25
See application file for complete search history.

(56) References Cited

U.S. PATENT DOCUMENTS

| | | | | |
|---|---|---|---|---|
| 6,942,575 B2 * | 9/2005 | Mergler | .......... | 463/42 |
| 2002/0137557 A1 * | 9/2002 | Ishii et al. | .......... | 463/8 |
| 2004/0143852 A1 * | 7/2004 | Meyers | .......... | 725/133 |
| 2004/0266505 A1 * | 12/2004 | Keam et al. | .......... | 463/1 |
| 2005/0137015 A1 * | 6/2005 | Rogers et al. | .......... | 463/42 |
| 2005/0143174 A1 * | 6/2005 | Goldman et al. | .......... | 463/42 |

FOREIGN PATENT DOCUMENTS

| | | |
|---|---|---|
| JP | 2003-150820 | 5/2003 |
| KR | 10-2001-0000405 A | 1/2001 |

(Continued)

OTHER PUBLICATIONS

"Diablo 2", from http://www.amazon.com/Diablo-2-Pc/dp/product-description/B00002CF9M, content relied on copywrighted 1998 and 2000 by Gamespot Inc.*

(Continued)

*Primary Examiner* — Melba Bumgarner
*Assistant Examiner* — Steven J Hylinski
(74) *Attorney, Agent, or Firm* — H.C. Park & Associates, PLC

(57) ABSTRACT

The present invention relates to a system for registering a game item sale and a method thereof, in which location of item data is moved to a sales storage area of a predetermined inventory allocated to an operation character and registration with respect to a corresponding game item for sale is enabled to be performed. There is provided a system for registering a game item sale, comprising: an inventory maintaining at least one storage area for storing item data with respect to a game item held by an operation character; an area defining means defining at least one portion of the storage area as a sales storage area; a transaction register linking the sales storage area to a sale field of a predetermined exchange database and in response to location movement of the item data to the sales storage area, controlling the game item to be recorded in the sale field of the exchange database; and an operation control means controlling a predetermined effect to be added to the operation character in accordance with the location movement of the item data; wherein the effect is display information on the location movement of the item data.

29 Claims, 10 Drawing Sheets

<SALE FIELD>

RECORD : GAME ITEM

| GAMER ID | GAMER ITEM | | ITEM PRICE |
|---|---|---|---|
| paladin |  | sword Lv 4 | 300 Gold |
| paladin |  | herb Lv 2 | 50 Gold |
| dark wizard |  | cold wand Lv 3 | 850 Gold |
| . . . | | . . . | . . . |

FOREIGN PATENT DOCUMENTS

| KR | 10-2001-0000405 A | 1/2001 |
|---|---|---|
| KR | 10-2002-0005895 A | 1/2002 |
| KR | 10-2002-00005895 A | 1/2002 |
| KR | 10-2002-0067248 A | 8/2002 |
| KR | 10-2002-0067248 A | 8/2002 |
| KR | 10-2003-0000362 A | 1/2003 |
| KR | 10-2003-0000362 A | 1/2003 |
| WO | WO 02067178 A1 * | 8/2002 |

OTHER PUBLICATIONS

"Diablo II" game manufacturers instruction manual, Copyright 2000 by Blizzard Entertainment. Sourced from http://www.replacementdocs.com.*

Office Action Dated May 26, 2009 of Corresponding Japanese Patent Application No. 2007-503835—3 pages.

Qbist Inc., Final Fantasy XI Online Vana' diel World Report version. 021002, Japan, Digicube Nomeno Tadamichi Inc., Nov. 7, 2002, First Edition, p. 61.

For Gamer editorial department, Microsoft Dungeon Siege Official Guidebook, Japan, Softbank Publishing Inc., Jun. 10, 2002, First Edition, p. 15.

Nakasima Syo et al., Depth Fantasia Official Guidebook—Kingdom of Twilight—corresponding edition, Japan, Softbank Publishing Inc., Aug. 22, 2002, First Edition, p. 23.

* cited by examiner

<KEEPING INVENTORY>

STORAGE AREA

SALES STORAGE AREA

<MOUNTING INVENTORY>

<SALE FIELD>

RECORD : GAME ITEM

| GAMER ID | GAMER ITEM | ITEM PRICE |
|---|---|---|
| paladin |  sword Lv 4 | 300 Gold |
| paladin |  herb Lv 2 | 50 Gold |
| dark wizard |  cold wand Lv 3 | 850 Gold |
| . . . | . . . | . . . |

FIG. 7

<SALE FIELD>

RECORD : ITEM SALE INFO

| IDENTIFIER INFO ▬ | NAME INFO ▼ | SELLING PRICE INFO ▲ |
|---|---|---|
| paladin | sword Lv 4 | 300 Gold |
| warrier | sword Lv 4 | 290 Gold |
| paladin | herb Lv 2 | 50 Gold |
| thief | cold wand Lv 3 | 1,000 Gold |
| dark wizard | cold wand Lv 3 | 850 Gold |

REGISTRATION SYSTEM FOR GAME ITEM SALE AND A METHOD THEREOF

CROSS-REFERENCE TO RELATED APPLICATIONS

This application is a continuation of International Patent Application No. PCT/KR2005/000767, filed on Mar. 17, 2005, which claims priority to Korean Patent Application No. 10-2004-0018230, filed on Mar. 18, 2004. International Application No. PCT/KR2005/000767 was published in English as WO 2005/088502 on Sep. 22, 2005. Both International Patent Application No. PCT/KR2005/000767 including its publication and Korean Patent Application No. 10-2004-0018230 are incorporated herein by reference in their entirety.

BACKGROUND OF THE INVENTION

1. Field of the Invention

The present invention relates to a system for registering a game item sale and a method thereof, and more particularly, to a system for registering a game item sale and a method thereof, in which location of item data is moved to a sales storage area of a predetermined inventory allocated to an operation character and registration with respect to a corresponding game item for sale is enabled to be performed.

2. Description of the Related Art

An inventory for maintaining items is allocated to each of game characters in general role playing games such as a RPG, an ARPG, and the like. The inventory records an item obtained in the game, temporarily. The item stored in the inventory is a limited concept of equipments/tools which the game character is portable during the game. Only the limited number of items is limited to be stored in the inventory.

In order to overcome the limit in the number of storable items, a service of providing a predetermined gamer safe is being operated and the gamer safe increases the limited number of storable items. However, it is also true that it is impossible to store items unlimitedly. Accordingly, the gamer may sell/exchange items unavoidably due to his/her own necessity or due to short of a space storing maintaining items. For this, an existing game service adopts a method of preparing an exclusive selling place such as a market place and supporting sale/exchange with respect to items.

However, in case that a plurality of game characters is concentrated on a stage where the market place is located, there is a disadvantage that there may be overload to a game server in charge of the stage. Namely, in a method of selling/exchanging items like above, in case that a plurality of game characters exceeding capacity of the game server is concentrated on a narrow place (stage where the market place is located), there is a problem that quantity of polygons of each game characters to be processed increases and thereby signal processing for the game progress becomes unsmooth.

Moreover, since exchange of text messages is generally used between game characters and a chatting mode using system resources a lot is supported so as to exchange items, there is another problem that overload to the game server may occur more easily. The overload to the game server may have a negative effect in game progress of ordinary game characters that are not selling/exchanging items. For example, there is another problem that one hour (generally, five minutes) or so is delayed in simply passing through the stage where the market place is located, under circumstances.

In addition, according to the method of selling/exchanging items using the market place, a game character that is in a remote location from the market place may be located to a corresponding stage intentionally. Thereby, there is also a problem that a gamer loses his/her interests or concentrations on the game sharply.

Accordingly, there is required a new concept of a model for registering a game item sale, enabling the game item to be registered for sale in real-time and conveniently in a place where the game character is located without intentional movement to the market place for sale/exchange of items. In addition, there is required a model for registering a game item sale, enabling intention of a gamer who wants to sell the item and detailed information on the item registered for sale to be provided for a gamer who wants to purchase the item, conveniently, by generating a predetermined effect with respect to a game character holding the item registered for sale.

SUMMARY OF THE INVENTION

One aspect of the invention provides a method of coordinating sales transactions in a video game. The method may comprise: maintaining a record of items for sale by characters in a video game or users playing such characters; receiving a request from a terminal associated with a first user playing a first character or recognizing an action of the first character in the video game, wherein the request or action is to designate a first item as a sales item; updating the record of items indicating the first item as a sales item so that another character or a user playing the other character can purchase the item from the first user or the first character, wherein updating does not require that the first player stays in or moves to a space of the video game that is designated for sales transactions.

In the foregoing method, the video game may not provide a space that is designated for sales transactions. The video game may provide the space that is designated for sales transactions. The method may further comprise: receiving a request from a terminal associated with a second user playing a second character or recognizing an action of the second character in the video game, wherein the request or action is to purchase the first item; and updating the record of items indicating the first item is no longer a sales item, wherein updating does not require that the second player stays in or moves to a space of the video game that is designated for sales transactions. The updated record of items may comprise a description of the first item, a value for the first item, and an identification of the first user or the first character. The updated record of items may comprise an image representative of the first item. The method may further comprise sending a notification to the terminal associated with the first user when the first item is purchased from the first player.

Another aspect of the invention provides a method of selling items in a video game. The method comprises: displaying, on a first terminal associated with a first user playing a first character in a video game, an electronic catalog possessed by the first character and configured to list items that can be used in the video game; and designating a first item in the electronic catalog as a sales item in response to a first request or a first action by the first user, wherein designating the first item as a sales item does not require that the first character be in or move to a space of the video game designated for sales transactions.

In the foregoing method, the video game may not provide a space that is designated for sales transactions. The video game may provide the space that is designated for sales transactions. The method may further comprise displaying, on the first terminal associated with the first user, a visual effect in response to the request or action by the first user, wherein the visual effect indicates that the first character intends to sell the first item. The method may further comprise sending information indicative of the designation of the first item so that the first item is available to other users. The method may further comprise inputting a value for the first item, which can be viewed by other users of the video game. The method may further comprise displaying a visual effect in response to the first request or first action by the first user, wherein the visual effect indicates that the first character intends to sell the first item. The visual effect may be changed or deactivated if the number of characters staying in a predetermined space exceeds a predetermined number. The visual effect may comprise displaying information on the first item. The method may further comprise displaying an interface for showing items for sale and purchasing one or more of the items for sale. The method may further comprise sending a request to purchase an item among the items for sale using the interface; and updating the electronic catalog with the purchased item.

Yet another aspect of the invention provides a system for coordinating sales transactions in a video game. The system comprises means for maintaining a record of items for sale by characters in a video game or users playing such characters; means for receiving a request from a terminal associated with a first user playing a first character or recognizing an action of the first character in the video game, wherein the request or action is to designate a first item as a sales item; and means for updating the record of items indicating the first item as a sales item so that another character or a user playing the other character can purchase the item from the first user or the first character, wherein updating does not require that the first player stays in or moves to a space of the video game that is designated for sales transactions.

A further aspect of the invention provides a system for coordinating sales transactions in a video game. The system comprises means for displaying, on a first terminal associated with a first user playing a first character in a video game, an electronic catalog possessed by the first character and configured to list items that can be used in the video game; and means for designating a first item in the electronic catalog as a sales item in response to a first request or a first action by the first user, wherein designating the first item as a sales item does not require that the first character be in or move to a space of the video game designated for sales transactions.

The present invention is conceived to solve the aforementioned problems and the present invention provides a system for registering a game item sale and a method thereof, enabling a corresponding game item to be registered for sale by moving item data corresponding to the game item to a defined sales storage area in an inventory.

The present invention also provides a system for registering a game item sale and a method thereof, enabling a game service user with intention of purchasing a game item to visually easily recognize an operation character having the game item registered for sale by adding an effect to the operation character.

The present invention also provides a system for registering a game item sale and a method thereof, visually providing information on registration of the game item sale of a corresponding game character by rendering processing an image item in a predetermined external location of an operation character maintaining the game item registered for sale.

The present invention also provides a system for registering a game item sale and a method thereof, enabling purchasing of an economical game item through comparison of prices between game items by enabling an access to a predetermined sale field regardless of game service access of a game character who has registered the game item sale for and guaranteeing an active selection of a gamer with respect to selling price of the game item registered for sale.

According to an aspect of the present invention, there is provided a system for registering a game item sale, comprising: an inventory maintaining at least one storage area for storing item data with respect to a game item held by an operation character; an area defining means defining at least one portion of the storage area as a sales storage area; a transaction register linking the sales storage area to a sale field of a predetermined exchange database and in response to location movement of the item data to the sales storage area, controlling the game item to be recorded in the sale field of the exchange database; and an operation control means controlling a predetermined effect to be added to the operation character in accordance with the location movement of the item data; wherein the effect is display information on the location movement of the item data.

Furthermore, according to another aspect of the present invention, there is provided a method for registering a game item sale, comprising the steps of: maintaining at least one storage area for storing item data with respect to a game item held by an operation character; defining at least one portion of the storage area as a sales storage area; linking the defined sales storage area to a sale field of a predetermined exchange database and in response to location movement of the item data to the sales storage means, recording the game item in the sale field of the exchange database; and controlling a predetermined effect to be added to the operation character in accordance with location movement of the item data; wherein the step of controlling a predetermined effect to be added to the operation character includes the steps of: detecting a location of the operation character corresponding to that of the competing character; in case that it is determined that the location of the operation character corresponding to that of the competing character is less than a predetermined value, adding the effect to the operation character; and in response to a click selection of a predetermined second gamer with respect to the operation character added with the effect, connecting the second gamer to the exchange database.

BRIEF DESCRIPTION OF THE DRAWINGS

FIG. 7 is a view illustrating one example of configuration of a sale field according to another embodiment.

DETAILED DESCRIPTION OF EMBODIMENTS

Hereinafter, a system for registering a game item sale and a method thereof will be described with reference to the accompanying drawings.

A game item used in the present specification may be an item which is mounted to an operation character controlled by a first gamer and thereby, usable in a game. The game item may designate a game progress component which registers the item to a predetermined item exchange (an exchange database) for sale and transfers the registered item to another character (a competing character) through predetermined settlement processing in accordance with determination of the first gamer. Moreover, information on registration of the game item sale of a corresponding game character is visually provided for a second gamer having purchase intention with respect to a predetermined game item, by rendering processing an image item of a 'sales box' type in a predetermined external location of the operation character having the game item registered for sale.

Figure 1:
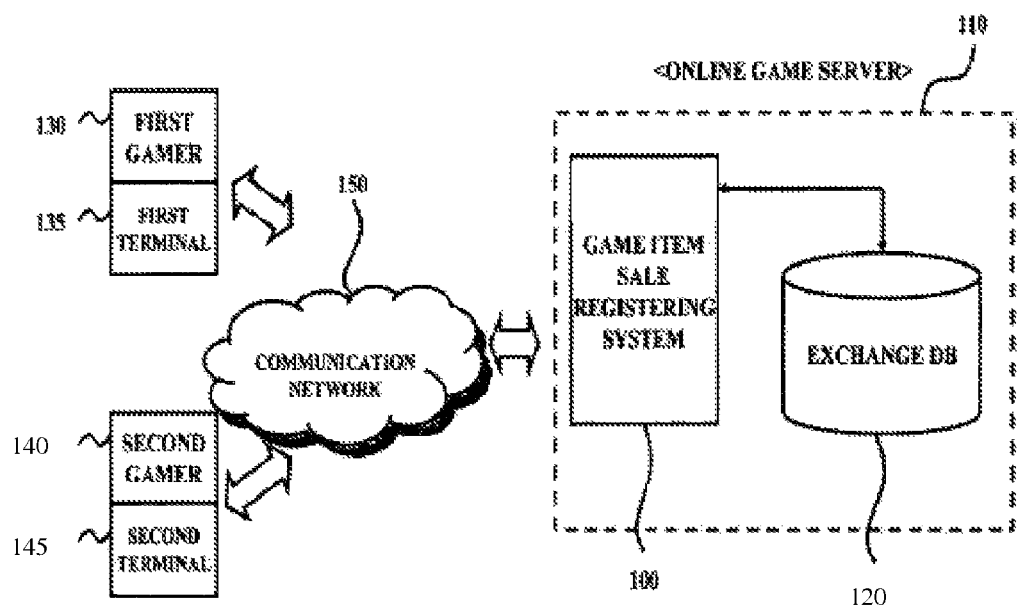
FIG. 1 is a view illustrating schematic operations of a system for registering a game item sale according to one embodiment.

FIG. 1 is a view illustrating schematic operation of a system for registering a game item sale according to an embodiment.

A game item sale registering system 100 receives item sale information with respect to a game item wanted to sell in accordance with determination of a first gamer 130. At this time, the system 100 serves to move location of item data to a particular storage area of a predetermined inventory (an item storage place), which is allocated to each of operation characters, and thereby, to control a corresponding game item to be registered for sale, i.e. to control the game item to be recorded in a sale field of a predetermined exchange database 120. In the present embodiment, the system 100 is limited to operate in an online-based game, particularly in an online roll playing game in which exchange of game items is very active, which is for convenience of description. It will be apparent to those skilled in the related art that technical spirits of the present invention may be applied to personal computer-based games, video consol-based games, and the like.

First, an online game server 110 is connected to predetermined terminals 135 and 145 of a first gamer 130 or a second gamer 140 and a communication network 150. The online game server 110 serves to provide the first gamer 130 or the second gamer 140 with an online game service. For example, the online game server 100 may be a MUD (Multiple User Dialogue) game service server, a MUG (Multiple User Graphic) game service server, or the like. In case that the fist gamer 130 or the second gamer 140 who has installed a game program in terminals 135 and 145 accesses the online game server 110, the game service provided at the online game server 110 transmits predetermined game progress data or game patch necessary for the game to the terminals 135 and 145, and enables the game to be performed by using game characters (an operation character and a competing character) controlled by gamers 130 and 140.

An exchange database 120 registers a game item for sale in accordance with a selection of the first gamer. Particularly, as item data corresponding to the game item that belongs to the operation character is moved to a particular recording area of the inventory, the exchange database 120 records the corresponding game item in a sale field thereof 120. That is, the exchange database 120 registers the game item that the first gamer 130 wants to sell and provides information on the game item for the second gamer 140 who wants to purchase the same. Thereby, the exchange database 120 serves to enable registration of game items and settlement processing thereof to be performed easily.

The first gamer 130 may be an internet user who holds the first terminal 135 to access the communication network 150, and is provided with a predetermined game service by receiving game progress data or game patch for game progress from the online game server 110. At this time, the first gamer 130 is under a predetermined contract with the online game server 110. In addition, the first gamer 130 controls operations of the operation character for game progress and moves one portion of item data corresponding to the game item to a predetermined area of the inventory allocated to the operation character, so as to register the game item for sale.

Moreover, the second gamer 140 is a game service user who holds the second terminal 145 to access the communication network 150, and has purchase intention with respect to the game item registered to the exchange database 120. The second gamer 140 moves the game item purchased through predetermined settlement processing to the inventory of the competing character of which operations are controlled and uses the purchased game item in the game.

The terminals 135 and 145 maintain a connection state with the online game server 110 through the communication network 150, such as Internet, a telephone line, and the like, and display the online game. Namely, the terminals 135 and 145 are a general concept for a terminal with predetermined computation capacity by providing a predetermined memory means and a predetermined microprocessor, such as a personal computer, a handheld computer, a PDA (Personal Digital Assistant), a cellular phone, a smart phone, and the like.

The game item sale registering system 100 serves to enable the second gamer 140, who is a game service user with purchase intention with respect to the game item, to visually recognize the operation character having the game item registered for sale, by adding an effect with respect to the operation character who has registered the game item for sale. Particularly, the game item sale registering system 100 is enabled to confirm sale registration information by registering the game item for sale and rendering processing an image item to external appearance of the operation character. At this time, the image item has a meaning of "holding a game item registered for sale". Hereinafter, configuration of a game item sale registering system 200 will be described with reference to FIG. 2.

Figure 2:
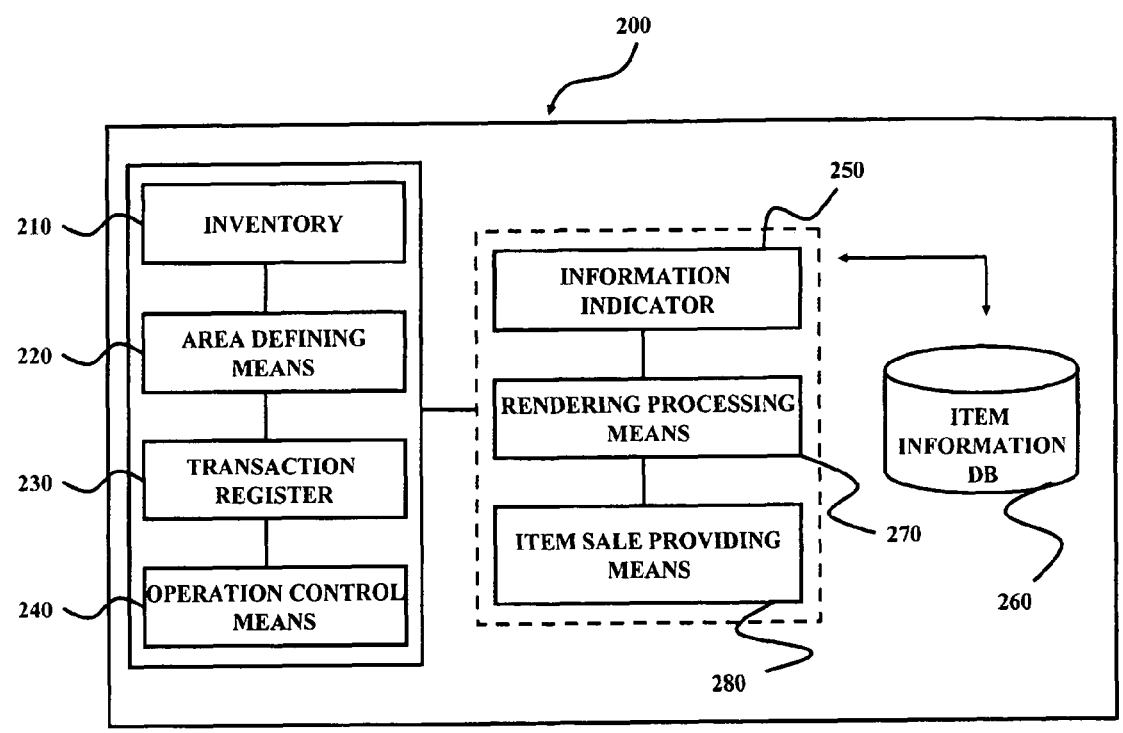
FIG. 2 is a configuration diagram illustrating a system for registering a game item sale according to an embodiment of the present invention.

FIG. 2 is a configuration diagram illustrating a system for registering a game item sale according to an embodiment of the present invention.

The game item sale registering system 200 includes an inventory 210, an area defining means 220, a transaction register 230, an operation control means 240, and an information indicator 250. Moreover, the system 200 serves to register a corresponding game item for sale as item data of the game item is moved to a predetermined storage area by the first gamer 130.

First, the inventory 210 maintains at least one storage area for storing item data corresponding to a game item that belongs to an operation character. The inventory 210 serves to store information on the game item obtained by the operation character in the game and enable related technology or equipments to be used in the game. Namely, storing the item data in the inventory 210 may be maintaining of the obtained game item or mounting of the game item which is used in the game. Particularly, in case that item data is recorded, the storage area specifies the corresponding game item to be mounted to the operation character. The storage area may control the game item to be realized on external appearance of the operation character in association with rendering processing thereto. At this time, item data includes an item name corresponding to the game item, information on a predetermined capacity value allocated thereto, and the like. For example, the system 200 includes item data in an icon imaging the game item and locates the icon in the storage area of the inventory 210, thereby storing item data easily. This is to provide a user interface, which enables a keeping state with respect to the game item to be recognized easily and enables item data to be moved easily. Hereinafter, the storage area constituting the inventory 210 and item data will be described with reference to FIG. 3.

Figure 3:
FIG. 3 is a view illustrating one example of configuration of an inventory according to an embodiment.
Figure 3:
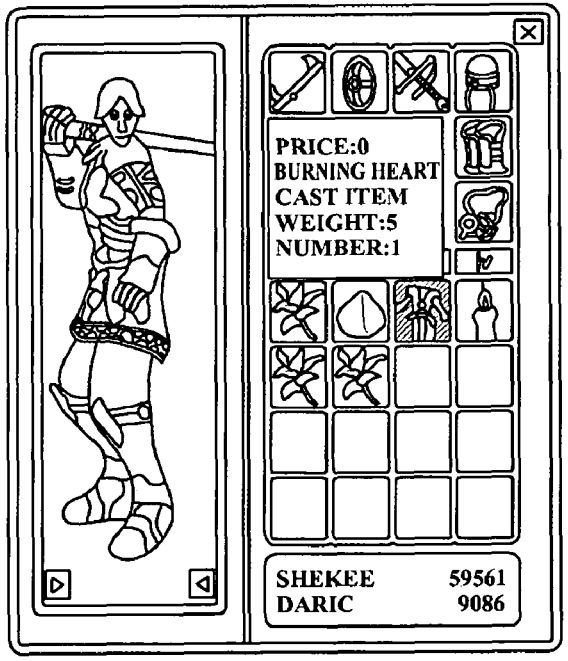

FIG. 3 is a view illustrating one example of configuration of an inventory according to the present invention.

The inventory 210 of FIG. 3 may consist of 'a keeping inventory' and 'a mounting inventory'. At this time, 'the keeping inventory' may be embodied, such that one portion of item data of the game item stored therein is moved to 'the mounting inventory' in accordance with a selection of gamers 130 and 140 and usable in the game. Namely, 'the keeping inventory' stores item data of the game item obtained by the operation character in the game and 'the mounting inventory' stores item data of the game item directly used by the operation character in the game. As aforementioned, item data stored in the inventory 210 may be included in the icon associated with the game item. In addition, the item data is enabled to move between the storage areas in accordance with movement (e.g., dragging after a click selection using an instruction input tool) of gamers 130 and 140 with respect to the icon. Moreover, the inventory 210 is divided into at least one storage area storing one item data independently and enables one icon to be stored in the divided storage areas, respectively. For example, the game item 'burning heart' that the operation character has obtained in the game is moved from 'the keeping inventory' to 'the mounting inventory' by a random selection of gamers 130 and 140, and stored in 'the mounting inventory'. In correspondence to movement to 'the mounting inventory', the game item 'burning heart' which is an armor type, as illustrated in FIG. 3, is rendering processed to external appearance of the operation character. In addition, in case that the instruction input tool is located on the storage area where the icon associated with 'the burning hear' is, item data with respect to the game item 'burning heart' is provided for the gamers 130 and 140 through a predetermined message window. At this time, the instruction input tool may be a computer keyboard, a mouse, a touch screen panel, a pen mouse, or the like. The game item sale registering system 200 controls item data associated with the game item to be provided on the user interface when a point of the instruction input tool is located on the icon stored in the storage area.

In the present embodiment, one item data (icon) is stored in one storage area. However, it is also possible to record one item data in at least two storage areas on the basis of importance of the game item or bulk/weight. Like above, the number of storage areas required for each game item may be determined flexibly by the operator of the online game system, based on system environments.

The area defining means 220 defines at least one portion of the storage area as the sales storage area. The area defining means 220 serves to define the storage area locating item data of the game item that the first gamer 130 wants to sell among his/her holding game items. The sales storage area is a storage area where the icon for sale is stored. Although, in the present embodiment, range of the sales storage area to be set is not particularly defined, it is preferable to set the range appropriately enough to accommodate the icon for sale. As illustrated in FIG. 3, 7 storage areas out of a plurality of storage areas constituting 'the keeping inventory' are set as the sales storage areas.

The transaction register 230 links the sales storage area to a sale field of the exchange database 120 and in response to movement of the item data to the sales storage area, records the game item in the sale field of the exchange database 120. That is, the transaction register 230 serves to enable the corresponding game item to be registered for sale by moving item data (icon) within the inventory 210, without moving the operation character or the competing character to a particular market place for transaction of the game item registered for sale. For example, referring to FIG. 3, icons corresponding to game items 'sword' and 'herb medium' are moved to the storage area defined as the sales storage area. The transaction register 230 registers the game items 'hear medium' and 'sword' in the sale field of the exchange database 120 and enables game items to be purchased/sold and exchanged with the competing character.

The operation control means 240 controls a predetermined effect to be added to the operation character in accordance with movement of item data. The operation control means 240 serves to enable visual information to be provided with respect to the operation character holding the game item registered for sale. Namely, the operation control means 240 adds an effect to the operation character in correspondence to movement of item data and enables the second gamer 140 with purchase intension to recognize that the operation character holds the game item for sale easily. At this time, the effect is display information with respect to the movement of the item data and the display information may be provided for the second gamer 140 with purchase intention through image processing with respect to the operation character or through a predetermined message window. For example, the operation character, in which predetermined item data (icon) is moved to the sales storage area, may be indicated of an image of aurora around external appearance of the operation character as an effect. Otherwise, as the operation character appears, a message window including text/image information on sale registration may be indicated for the second gamer 140 (or the first gamer 130). In the present embodiment, display information that the second gamer 140 recognizes visually is exemplified as the effect. However, this is one embodiment of the present invention and audio information or sense information (e.g., vibration) with respect to the instruction input tool may be provided.

Accordingly, according to the present invention, there is an effect that it is possible to provide a user interface enabling registration of the game item by moving item data corresponding to the game item to the defined sales storage area.

Particularly, the operation control means 240 determines a location of the operation character and that of the competing character in the game. In case that the location of the operation character corresponding to that of the competing character is less than a predetermined value, the operation control means 240 controls an effect to be added to the operation character. Namely, in case that the operation character approaches the visual range of the competing character, the operation control character 240 adds an effect to the operation character to provide the second gamer 140 with information on sale registration of the game item. Accordingly, there is an effect that it is possible to enable the second gamer 140 to recognize easily whether the game character holds the game item registered for sale by confirming the effect which is easy to be identifiable visually. Moreover, the operation control means 240 does not add an effect continuously and in case that the operation character approaches the visual range of the competing character, the operation control means 240 adds an effect to the operation character. Thus, it is possible to reduce system overload caused by adding of the effect.

In response to generation of a predetermined information providing event, the information indicator 250 displays the game item recorded in the sale field of the exchange database 120 to the second gamer 140 of the competing character. Namely, the information indicator 250 serves to provide the second gamer 140 with information on the game item registered for sale by at least one first gamer 130. At this time, the information providing event may be a kind of instruction language, which enables an information request of the second gamer 140 with respect to providing of information to be recognizable in the game item sale registering system 200. The information providing event may be generated in accordance with a predetermined short-cut associated with a link connection to the sale field or a click selection of the second gamer 140 with respect to the operation character added with the effect. The short cut may be a hot key provided for the second gamer 140. The information providing event may be generated by a click selection using the instruction input tool. In addition, the information providing event may be generated at a point where the second gamer 140 selects the operation character by using the instruction input tool. Moreover, in case that a point of the instruction input tool approaches within the certain range of the game screen occupied by the operation character added with the effect or in case that the instruction input tool contacts the operation character, the information indicator 250 may provide the second gamer 140 with item information, as notice information, with respect to the game item registered for sale by the corresponding operation character. For example, in case that a point of the instruction input tool of the second gamer 140 contacts the operation character on the game screen occupied by the operation character, the information indicator 250 may provide the second gamer 140 with item information with respect to the game item registered for sale, together with character information (a gamer ID, capacity value information, etc) of the operation character. Hereinafter, item data provided by the information indicator 250 will be described with reference to FIG. 4.

Figure 4:
FIG. 4 is a view illustrating one example of a sale field provided for a second gamer.
Figure 4:
Figure 4:
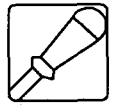

FIG. 4 is a view illustrating one example of configuration of the sale field provided for a second gamer according to the present invention.

Referring to FIG. 4, game items 'sword Lv4', 'herb Lv2', 'cold wand Lv3', and the like, which are registered for sale by the first gamers 'paladin' and 'dark wizard', are recorded in the sale field. As aforementioned, the first gamers 'paladin' and 'dark wizard' move icons associated with the game items, 'sword Lv4', 'herb Lv2', and 'cold wand Lv3' to a predetermined sales storage area and registers the same in the sale field. The game items recorded in the sale field are provided for the second gamer 140 by the information indicator 250 in accordance with the information providing event and awaits a selection of the second gamer 140 who wants to purchase the game item. Particularly, the sale field includes data with respect to identifier information of the first gamer who has registered the game item (a gamer ID) for sale, name information (a game item or an icon), and selling price information (item price), as indexes. Thus, the information indicator 250 enables the second gamer 140 to clearly recognize current state information according to purchasing of the corresponding game item.

According to another embodiment of the present invention, rendering processing a predetermined image item to external appearance of the operation character to notify registration of the game item for sale will be described.

For rendering processing of the game item, the game item sale registering system 200 may further comprise an item information database 260 and a rendering processing means 270.

First, the item information database 260 stores the predetermined image item, which is visually indicated in display data of the operation character. At this time, the image item may be a kind of a notice item which is rendering processed to the game character in association with registration of the game item. Namely, the image item visualizes information, "holding the game item registered for sale". For example, the image item may be a sales box formed of a bag that the game character can carry. In addition, the item information database 260 serves to store the game item obtained in the game and in case that a predetermined criterion is satisfied (e.g., in case that item data is moved to the aforementioned mounting inventory), stores data associated with rendering. At this time, the rendering enables the obtained game item to be mounted to the operation character and indicated. Moreover, display data may designate information data enabling external appearance of the operation character to be embodied in the game, and the image item may be combined into the display data and realized on the screen.

The rendering processing means 270 abstracts the image item from the item information database 260 in accordance with movement of item data, and combines the abstracted image item into display data of the operation character and outputs the same. Namely, the rendering processing means 270 serves such that the image item such as the sales box or the like is realized on external appearance of the game character, together with sale registration of the game item. Accordingly, the game character who has registered the predetermined game item for sale is rendering processed by the image item. For example, the rendering processing means 270 may enable the second gamer 140 to recognize that the corresponding game character holds the game item registered for sale by confirming the realized image item.

The image item such as the sales box, or the like, is rendering processed to external appearance of the game character holding the game item registered for sale. However, this is one embodiment of the present invention and it will be apparent that there may be variety of methods of notifying the fact that the game item is registered for sale, such as a method of realizing the game item registered for sale on external appearance of the game character directly. For example, as illustrated in FIG. 3, in case that the game items, 'sword Lv4' and 'herb Lv2', move to the sales storage area, the rendering processing means 270 defines a predetermined 'sales box' (imaging of the sales box) on external appearance of the operation character and abstracts data associated with rendering of game items from the item information database 260 and thereby, makes rendering processing on the 'sales box' possible. At this time, the game items are associated with 'sword Lv4' and 'herb Lv2'. The rendering processing means 270 is rendering processing the abstracted game item within the defined 'sales box'. However, it will be apparent to those skilled in the related art that rendering location may be defined flexibly by the operator of the present system, based on system environments.

According to another embodiment of the present invention, procedures of purchasing the game item recorded in the sale field of the exchange database 120 will be described.

The game item sale registering system 200 may further include an item sale providing means 280 for processing purchase. The item sale providing means 280 provides a predetermined user interface for transaction, in accordance with a selection signal of the second gamer 140 in the sale field.

Namely, the item sale providing means 280 provides the second gamer 140 with the user interface for transaction, in response to the selection signal of the second gamer 140 with respect to the game item. In other words, in case that a selection signal (e.g., a click selection with respect to the particular game item recorded in the provided sale field) is received from the second gamer 140 with purchase intension with respect to the particular game item, the item sale providing means 280 serves to transmit a user interface for purchasing the game item to the second gamer 140. The user interface is for inputting information on the second gamer 140 in which the information is required for settlement processing with respect to the game item. For example, information, such as financial settlement means information (e.g., use of game money, cash transfer, a credit card, etc), settlement period information (e.g., immediate settlement, reservation settlement, etc), and the like, is received through the user interface. Moreover, the aforementioned operation control means 240 controls settlement processing with respect to the game item to be performed in correspondence to information input of the second gamer 140 into the user interface for transaction. A settlement module performs settlement processing with respect to charged amount. At this time, the charged amount is determined when the game item registered for sale is transferred to the maintaining game item of the competing character. The game item sale registering system 200 may use predetermined game money that belongs to the second gamer 140, charging the same 140. In case that the game money is short, game money may be additionally secured through exchange with a certain means including a monetary value such as cash, account transfer, credit card transaction, or the like.

Accordingly, in purchasing the game item registered for sale, there is an effect that it is possible to provide convenience enabling purchase/settlement with inputting into the user interface provided when the second gamer 140 clicks the game item.

Hereinafter, as for another embodiment of the present invention, item sale information transmitted for sale registration according to movement of item data will be described.

Figure 5:
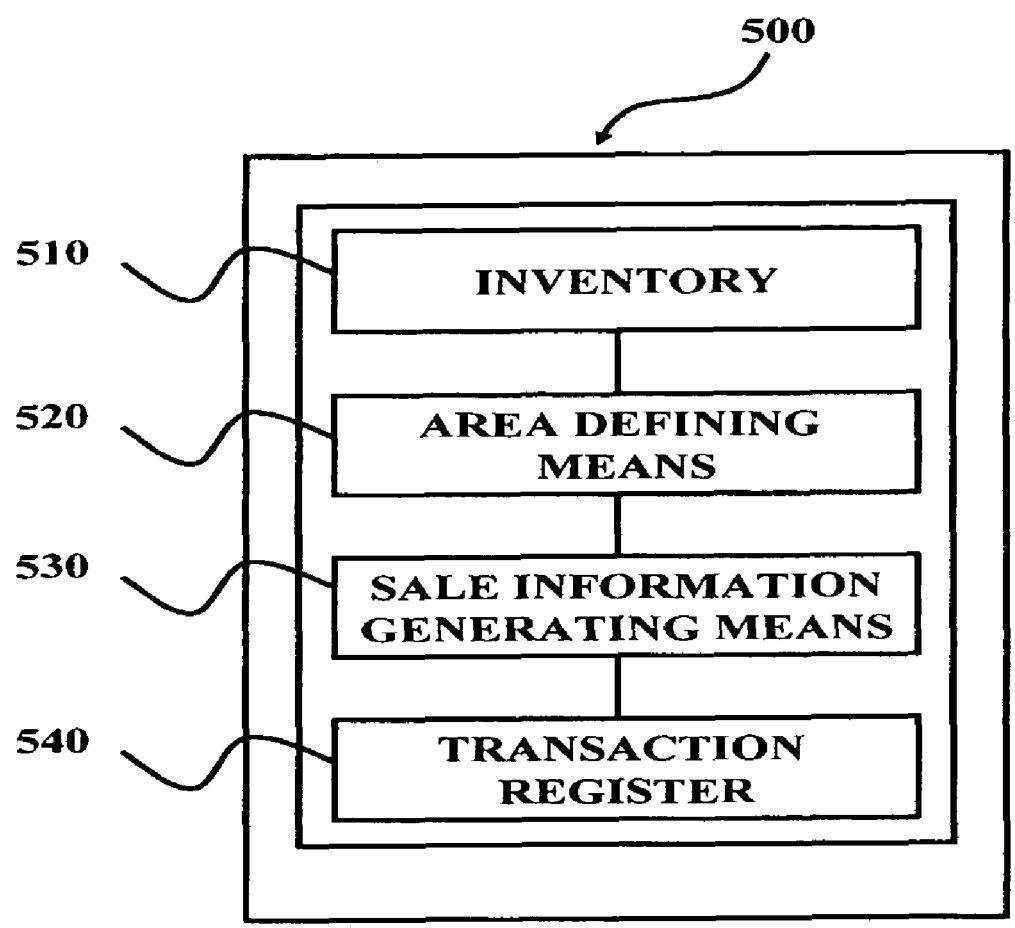
FIG. 5 is a configuration diagram illustrating a system for registering a game item sale according to another embodiment of the present invention.

FIG. 5 is a configuration diagram illustrating a system for registering a game item sale according to another embodiment of the present invention.

A game item sale registering system 500 includes an inventory 510, an area defining means 520, a sale information generating means 530, and a transaction register 540. The system 500 serves to transmit predetermined item sale information to the exchange database 120 as item data of the game item is moved to the sales storage area by the first gamer 130.

The inventory 510 maintains at least one storage area for storing item data with respect to the game item that belongs to the operation character. The area defining means 520 defines at least one portion of the storage area as the sales storage area. Namely, predetermined one portion of plurality of storage areas included in the inventory 510 is defined as the sales storage area by the area defining means 520. Detailed description has been aforementioned and thus, will be omitted herein (refer to FIG. 3).

The sale information generating means 530 generates predetermined item sale information, in response to movement of item data to the defined sales storage area. At this time, the item sale information is information on purchasing/selling of the game item, and includes identifier information corresponding to the first gamer 130, name information of the game item, selling price information, and the like, in which the first gamer 130 controls the operation character. Like above, the item sale information may be generated by the sale information generating means 530, in association with movement of item data to the storage area defined as the sales storage area, for example, in association with movement of the icon. Generation of item sale information will be further fully described with reference to FIGS. 6 and 7.

Figure 6:
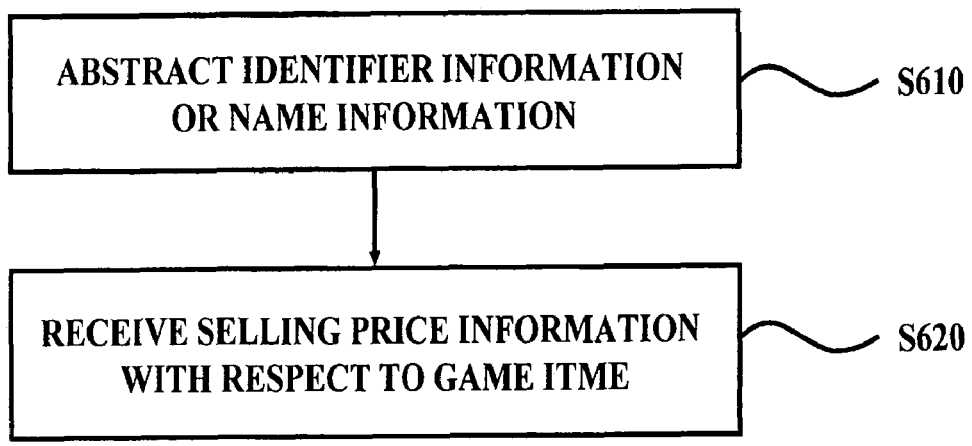
FIG. 6 is a flowchart illustrating a method of generating item sale information by a sale information generating means in an embodiment.

FIG. 6 is a flowchart illustrating a method of generating item sale information by the sale information generating means.

The sale information generating means 530 identifies a game item of moved item data and abstracts identifier information or name information from a predetermined information database (not illustrated) with reference to the identified game item (S610). This step S610 may be a procedure for recognizing purchase intention with respect to the game item of the first gamer 130 and abstracting identification data (a user ID) of the first gamer 130 who wants to register the game item for sale or identification data (an item name) of the game item which is to be registered for sale. The information database may be a user database maintaining personal information of the first gamer 130 who is under contract with the online game server 110 to provide a game service, or a gamer server database storing data information with respect to all the game items generating while the game is in progress. Namely, in this step S610, as the first gamer 130 moves item data to the sales storage area, identifier information of the corresponding gamer or name information of the corresponding item data is abstracted from the sale information generating means 530 and included in item sale information. According to the present embodiment, name information of the game item is abstracted. However, this is one embodiment of the present invention and it will be apparent to those skilled in the related art that variety of information included in item data may be abstracted selectively.

In addition, the sale information generating means 530 receives selling price information with respect to the identified game item from the first gamer 130 (S620). This step S620 is a procedure for receiving information on selling price of the game item registered for sale, from the first gamer 130. In this step S620, selling price information of the game item is generated by a selection input of the first gamer 130. Accordingly, there may be difference in selling prices between the same game items in accordance with information inputted from the first gamer 130 who has registered the game item for sale. The second gamer 140 may perform purchasing through comparison of prices, which will be described later.

Accordingly, there is an effect that contraction on the game is improved and the second gamer 140 is enabled to purchase the game item more economically.

The transaction register 540 transmits the generated item sale information to the exchange database 120 and controls the transmitted item sale information to be recorded in the sale field of the exchange database 120. Namely, the transaction register 540 serves to control at least one transmitted item sale information to be recorded in the sale field and in response to the information providing event of the second gamer 140, to provide the recorded item sale information to the second terminal 145 of the second gamer 140. In addition, in response to a sorting signal from the second gamer 140, the transaction register 540 may sort item sale information, based on at least one piece of information among identifier information, name information, and selling price information. The sorting signal is for processing the recorded item sale information. For example, the sorting signal may enable a variety of sorting to be performed, such as sorting in order of characters, sorting in order of numbers, sorting in order of registration, etc, in such a manner that the second gamer 140 clicks and inputs with respect to index of the sale field using an instruction input tool. Particularly, since it is possible to sort game items in order of highest purchasing/selling prices or in order of lowest prices based on selling price information, the second gamer 140 is enabled to purchase the low-priced game item through comparison of prices. Hereinafter, the sale field storing item sale information will be described with reference to FIG. 7.

FIG. 7 is a view illustrating one example of configuration of a sale field according to another embodiment of the present invention.

According to FIG. 7, the sale field is provided for the second gamer 140 in response to generation of the information providing event from the second gamer 140 and the sale field is sorted in order of characters (in order of Hangul consonants and vowels) with respect to name information and in order of highest numbers (in order of highest prices) with respect to selling price information. For example, the second gamer 140 who wants to purchase the game item 'sword Lv4' may click a predetermined sorting function key provided in an index of the game field. The transaction register 540 sorts item sale information in accordance with the click of the sorting function key. Through the sorted information, the game item sale registering system 500 enables the second gamer 140 to recognize that the selling price of the same game item 'sword Lv5 ' is cheaper than that suggested by the first gamer 'warrier'. Namely, since the sale field provided for the second gamer 140 enables game items registered for sale to be sorted in accordance with selling prices and information to be provided thereby, the second gamer 140 is enabled to purchase the game item through comparison of prices.

Accordingly, it is possible to move the game item wanted to sell to a particular storage area in the inventory and register the game item for sale. Thus, there is an effect that it is possible to prevent inconvenience of moving the operation character to a predetermined game stage in order to sell the game item. In addition, the second gamer 140 who wants to purchase the game item is provided with information on game items registered for sale, regardless of access or no-access of the operation character. Thus, there is an advantage that procedures of purchasing the game item are simplified.

Although there is not illustrated in FIGS. 2 and 5, the game item sale registering system 200 according to one embodiment of the present invention may further include a database management module for managing the aforementioned item information database 260. The database management module of the game item sale registering system 200 may be embodied for the purpose of Relational Database Management Systems (RDBMS) such as Oracle, Infomix, Sybase, and DB2, or Object-Oriented Database Management Systems (OODBMS) such as Gemston, Orion, O2, and the like.

Operation of the game item sale registering system 200 will be described in detail.

Figure 8:
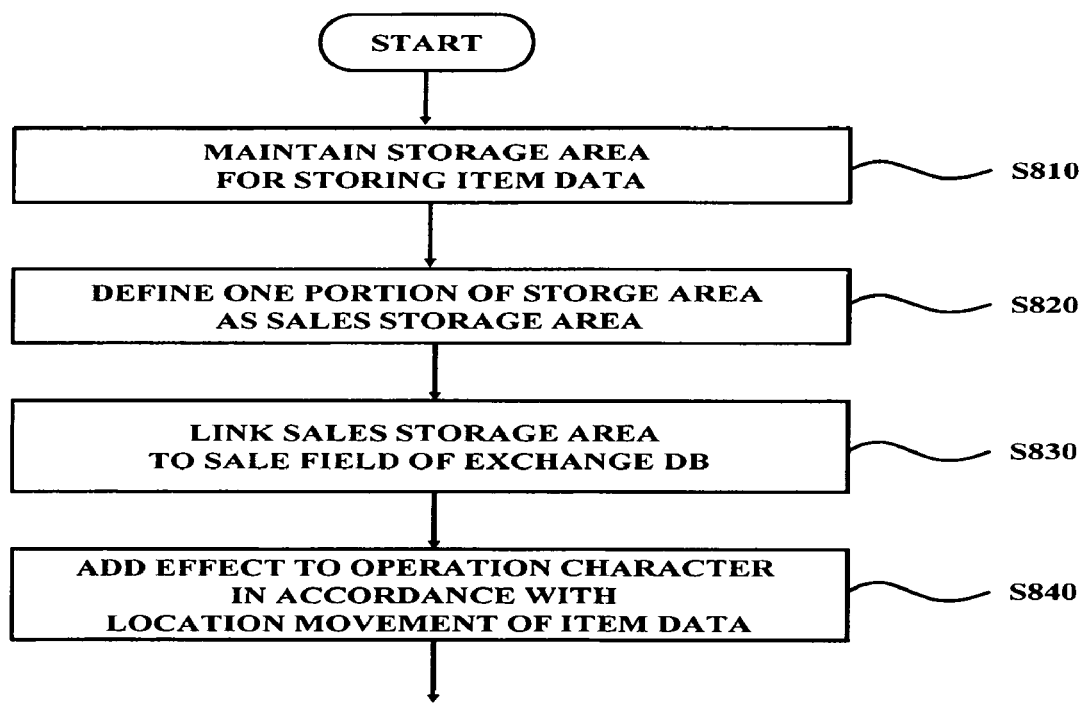
FIG. 8 is a flowchart illustrating a method of registering a game item sale according to an embodiment of the present invention.

FIG. 8 is a flowchart illustrating a method of registering a game item sale according to one embodiment of the present invention.

The method of registering the game item sale according to the present embodiment is performed by the game item sale registering system 200.

The game item sale registering system 200 maintains at least one storage area for storing item data with respect to the game item that belongs to the operation character (S810). This step S810 is a procedure for maintaining the inventory 210 which keeps item data of the game item obtained in the game in the storage area independently. The item data may be used immediately in the game, by moving one portion of the item data to the particular storage area (mounting inventory) (refer to FIG. 3).

In addition, the game item sale registering system 200 defines at least one portion of the storage area as the sales storage area (S820). This step S820 is a procedure for defining the storage area where the item data of the game item wanted to sell is located. For example, the predetermined number of storage areas of 'the keeping inventory' is defined as the sales storage area by the area defining means 220 (refer to FIG. 3).

In the next, the game item sale registering system 200 links the defined sales storage area to the exchange database 120 (S830). This step S830 is a procedure for recording the game item in the sale field of the exchange database 120, in response to movement of the item data to the sales storage area. Accordingly, the game item sale registering system 200 moves item data associated with the game item wanted to sell to the sales storage area and registers the game item for sale.

In addition, the game item sale registering system 200 controls a predetermined effect to be added to the operation character in accordance with movement of item data (S840). This step S840 is a procedure for generating an additional game effect, such that the operation character holding the game item registered for sale is recognizable visually. At this time, the effect may be a kind of notice signal generated by rendering processing, to notify the second gamer 140 of the advent of the operation character. The effect includes, such as for example, on-and-off brightness of the operation character, aurora to external appearance of the operation character, a notice message, and the like. The effect like above enables the second gamer 140 to recognize the advent of the operation character in the game certainly and to obtain information required to purchase the game item from the operation character. Hereinafter, adding of the effect will be fully described with reference to FIG. 9.

Figure 9:
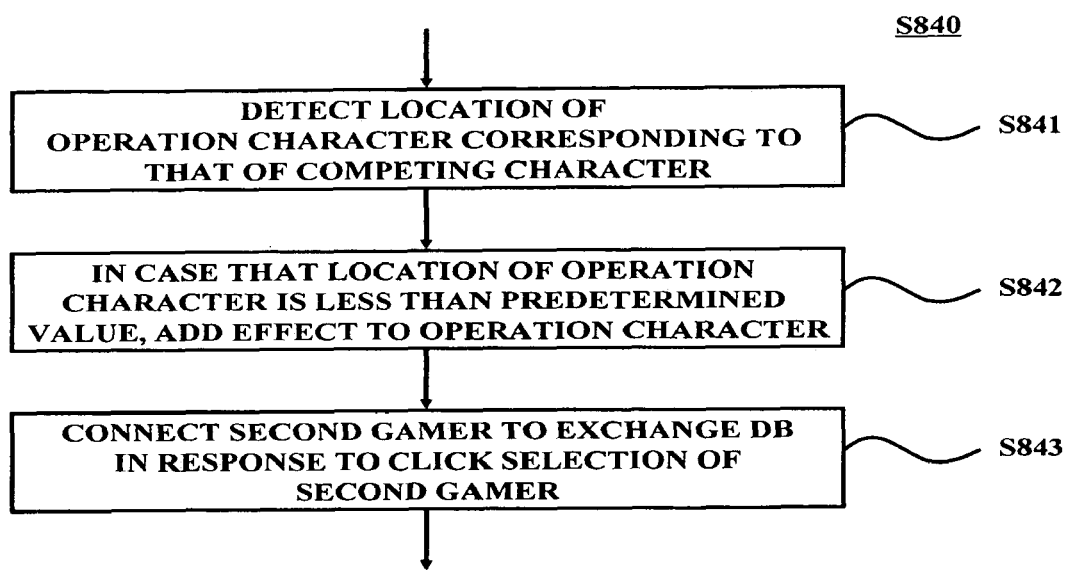
FIG. 9 is a flowchart illustrating one example of adding an effect to an operation character.

FIG. 9 is a flowchart illustrating one example of adding an effect to an operation character.

As illustrated in FIG. 9, the game item sale registering system 200 detects a location of the operation character corresponding to that of the competing character (S841). This step S841 is a procedure for determining whether the operation character holding the game item registered for sale appears on the game service screen which is provided for the second gamer 140. For example, the operation control means 240 determines whether the operation character appears within the visual range of the competing character. The competing character is controlled by the second gamer 140.

In case that it is determined that the location of the operation character corresponding to that of the competing character is less than a predetermined value in the S841, the game item sale registering system 200 adds an event to the operation character (S842). This step S842 is a procedure for adding an effect to the operation character when the operation character appears within the visual range of the competing character. Thus, it is possible to notify the second gamer 140 that the operation character has registered the game item for sale.

In addition, the game item sale registering system 200 connects the second gamer 140 to the exchange database 120, in response to a click selection of the second gamer 140 with respect to the operation character added with the effect (S843). This step S843 is a procedure for enabling the second gamer 140 with intention of purchasing the game item to select the operation character to which the effect is added and which appears on the game screen, and for connecting the second gamer 140 to the exchange database 120 to purchase the game item.

In the next, the game item sale registering system 200 performs predetermined settlement processing with respect to the game item registered for sale and controls the game item registered for sale to be transferred to the competing character of the second gamer 140 who has paid. Description related thereto will be as same as the aforementioned embodiment, and thus, will be omitted herein. At this time, the game item sale registering system 200 performs access to the exchange database 120 for settlement of the second gamer 140, in such a manner that the second gamer 140 clicks and selects the operation character. Thus, there is an effect that it is possible to improve convenience in accessing. In addition, the game item sale registering system 200 enables the second gamer 140 to access the exchange database 120 smoothly using a hot key, such as a short cut or the like, regardless of the visual range of the operation character or the first gamer 130's access or no access to the online game server. Thus, there is an effect that it is possible to extinguish restriction of space-time in performing settlement processing.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 10:
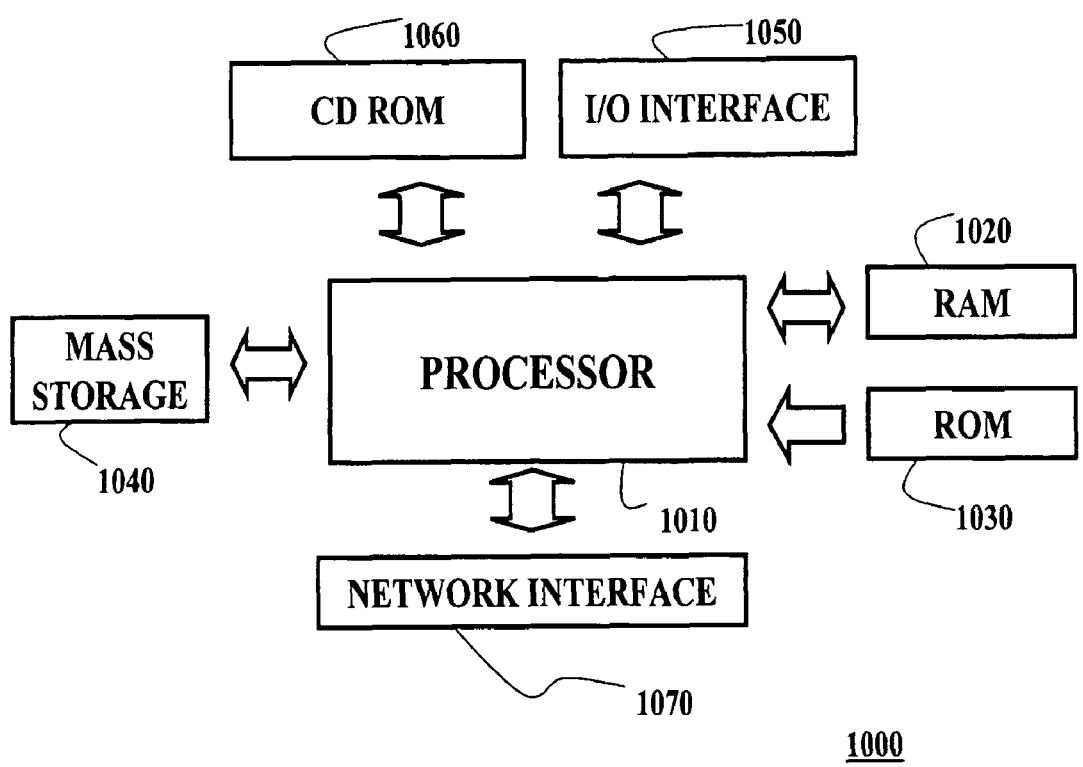
FIG. 10 is an internal block diagram of an internal block diagram which may be employed in implementing a method of registering a game item sale.

FIG. 10 is an internal block diagram of a general-purpose computer which can be more adopted in implementing the method for registering the game item sale according to the present invention.

The computer system 1000 includes any number of processors 1010 (also referred to as central processing units, or CPUs) that are coupled to storage devices including primary storage (typically a random access memory, or "RAM 1020"), primary storage (typically a read only memory, or "ROM 1030"). As is well known in the art, ROM 1030 acts to transfer data and instructions uni-directionally to the CPU and RAM 1020 is used typically to transfer data and instructions in a bi-directional manner. Both of these primary storage devices may include any suitable type of the computer-readable media described above. A mass storage 1040 is also coupled bi-directionally to CPU and provides additional data storage capacity and may include any of the computer-readable media described above. The mass storage device 1040 may be used to store programs, data and the like and is typically a secondary storage medium such as a hard disk that is slower than primary storage. A specific mass storage device such as a CD-ROM 1060 may also pass data uni-directionally to the CPU. Processor 1010 is also coupled to an interface 1050 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1010 optionally may be coupled to a computer or telecommunications network using a network connection as shown generally at a network interface 1070. With such a network connection, it is contemplated that the CPU might receive information from the network, or might output information to the network in the course of performing the above-described method steps. The above-described devices and materials will be familiar to those of skill in the computer hardware and software arts.

The processor 1010 may be used to implement various aspects of the invention discussed herein. For example, the processor 1010 may be used as a means for processing, updating, or otherwise maintaining the record of items designated for sale. The processor 1010 may also be used as a means to create images to display on user terminals 135 and 145. The processor 1010 may further be used as a means to process, update, or otherwise maintain items in the electronic catalog of user characters. The network interface 1070 may also be used as a means to implement various aspects of the invention discussed herein, including as a means to communicate between the record of items, in one embodiment, located on a game server 110, and user terminals 135 and 145.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

INDUSTRIAL APPLICABILITY

According to the present invention, there are provided a system for registering a game item sale and a method thereof, enabling a corresponding game item to be registered for sale by moving item data corresponding to the game item to a defined sales storage area in an inventory.

Also, according to the present invention, there are provided a system for registering a game item sale and a method thereof, enabling a game service user with purchase intention with respect to a game item to visually easily recognize an operation character having the game item registered for sale by adding an effect with respect to the operation character.

Also, according to the present invention, there are provided a system for registering a game item sale and a method thereof, visually providing information on registration of the game item sale of a corresponding game character by rendering processing an image item in a predetermined external location of an operation character maintaining the game item registered for sale.

Also, according to the present invention, there are provided a system for registering a game item sale and a method thereof, enabling purchasing of an economical game item through comparison of prices between game items by enabling an access to a predetermined sale field regardless of game service access of a game character who has registered the game item sale for and guaranteeing an active selection of a gamer with respect to selling price of the game item registered for sale.

What is claimed is:

1. A method that utilizes a processor to coordinate sales transactions in a video game, the method comprising:
    maintaining a record of items for sale by characters in a video game or users playing the characters;
    receiving a request from a terminal associated with a first user playing a first character or recognizing an action of the first character in the video game, wherein the request or the action is to designate a first item as a sales item;
    updating, using the processor, the record of items indicating the first item as a sales item so that a second character or a second user playing the second character can purchase the first item from the first user or the first character, wherein updating does not require that the first player stays in or moves to a space of the video game that is designated for sales transactions; and
    providing for display, without receiving an input from the second user, a visual effect visually associated with the first character to the second user,
    wherein the visual effect indicates to the second user that the first character has at least one associated item that is being offered for sale, and
    wherein the display of the visual effect is automatically provided when a differential distance between a location of the first character and a location of the second character is less than a determined amount.

2. The method of claim 1, wherein the video game does not provide the space comprising a specific virtual marketplace that is designated for sales transactions to which users must navigate to in order to designate items as sales items.

3. The method of claim 1, wherein the video game provides the space that is designated for sales transactions.

4. The method of claim 1, further comprising:
    receiving a request from a terminal associated with the second user playing the second character or recognizing an action of the second character in the video game, wherein the request or action is to purchase the first item; and
    updating the record of items indicating the first item is no longer a sales item, wherein updating does not require that the second player stays in or moves to the space of the video game that is designated for sales transactions.

5. The method of claim 1, wherein the updated record of items comprises a description of the first item, a value for the first item, and an identification of the first user or the first character.

6. The method of claim 1, wherein the updated record of items comprises an image representative of the first item.

7. The method of claim 1, further comprising sending a notification to the terminal associated with the first user when the first item is purchased from the first player.

8. The method of claim 1, wherein the second user can purchase the first item from the first user without having to navigate to the space comprising a specific virtual market place distant from the location of the first character to make the purchase.

9. The method of claim 1, wherein the visual effect is a change in an external appearance of the first character.

10. The method of claim 1, wherein the visual effect is a message provided for display in association with a display of the first character to the second user.

11. The method of claim 1, wherein the visual effect is automatically provided for display to the second user at least partly in response to detecting the location of the other character associated with the second user with respect to the first character.

12. A method that utilizes a processor to sell items in a video game, the method comprising:
    providing, using the processor, for display on a first terminal associated with a first user playing a first character in a video game, an electronic catalog possessed by the first character and configured to list items that can be used in the video game;
    designating, using the processor, a first item in the electronic catalog as a sales item in response to a first request or a first action by the first user, wherein designating the first item as a sales item does not require that the first character be in or move to a space of the video game designated for sales transactions; and
    providing for display, without receiving an input from a second user playing a second character, a visual effect visually associated with the first character to the second user,
    wherein the visual effect indicates that the first character has at least one associated item that is being offered for sale, and
    wherein the display of the visual effect is automatically provided when a differential distance between a location of the first character and a location of the second character is less than a determined amount.

13. The method of claim 12, wherein the video game does not provide the space comprising a specific virtual marketplace that is designated for sales transactions to which users must navigate in order to designate items as sales items.

14. The method of claim 12, wherein the video game provides the space that is designated for sales transactions.

15. The method of claim 12, further comprising providing for display on the first terminal associated with the first user, the visual effect in response to the first request or action by the first user, wherein the visual effect indicates that the first character intends to sell the first item.

16. The method of claim 12, further comprising sending information indicative of the designation of the first item so that the first item is available to other users.

17. The method of claim 12, further comprising inputting a value for the first item, which can be viewed by other users of the video game.

18. The method of claim 12, further comprising providing for display the visual effect in response to the first request or the first action by the first user, wherein the visual effect indicates that the first character intends to sell the first item.

19. The method of claim 12, further comprising changing or deactivating the visual effect if a number of characters staying in a determined space exceeds a determined number.

20. The method of claim 12, wherein the visual effect comprises displaying information on the first item.

21. The method of claim 20, further comprising displaying an interface for showing items for sale and purchasing one or more of the items for sale.

22. The method of claim 21, further comprising:
    sending a request to purchase an item among the items for sale using the interface; and
    updating the electronic catalog with the purchased item.

23. The method of claim 12, wherein the visual effect is a change in an external appearance of the first character.

24. A system to coordinate sales transactions in a video game, the system comprising:
- a database to store a record of items for sale by characters in a video game or users playing the characters;
- a first terminal, associated with a first user playing a first character, to communicate a request or an action of the first character in the video game, wherein the request or the action designates a first item as a sales item; and
- a second terminal to display, to a second user playing a second character, without receiving an input from the second user, a visual effect visually associated with the first character,
- wherein the visual effect indicates that the first character has at least one associated item that is being offered for sale,
- wherein the display of the visual effect is automatically provided when a differential distance between a location of the first character and a location of the second character is less than a determined amount, and
- wherein, in response to receiving the request from the first terminal or in response to the action of the first user, the database updates the record of items indicating the first item as a sales item so that the second user can purchase the item from the first user or the first character, and wherein updating the database does not require the first player to stay in or move to a specific market place space of the video game that is designated for sales transactions.

25. The system of claim 24, wherein the visual effect is a change in an external appearance of the first character.

26. The system of claim 24, wherein the system is configured to deactivate or change the visual effect if a number of characters staying in a determined space exceeds a determined number.

27. A system to coordinate sales transactions in a video game, the system comprising:
- a first terminal, associated with a first user playing a first character in a video game, to display an electronic catalog possessed by the first character and configured to list items that can be used in the video game;
- a second terminal to display to a second user playing a second character, without receiving an input from the second user, a visual effect visually associated with the first character, wherein the visual effect indicates that the first character has at least one associated item that is being offered for sale; and
- a server to designate a first item in the electronic catalog as a sales item in response to receiving a first request from the first terminal or in response to a first action by the first user, and wherein designating the first item as a sales item does not require the first character to move to a space of the video game designated for sales transactions,
- wherein the display of the visual effect is automatically provided when a differential distance between a location of the first character and a location of the second character is less than a determined amount.

28. The system of claim 27, wherein the visual effect is a change in an external appearance of the first character.

29. The system of claim 27, wherein the system is configured to deactivate or change the visual effect if a number of characters staying in a determined space exceeds a determined number.

* * * * *